Mar. 3, 1925.   1,528,553
G. F. KENNEDY ET AL
MOWING MACHINE FOR GRASS AND OTHER CROPS
Filed Aug. 24, 1920   4 Sheets-Sheet 3
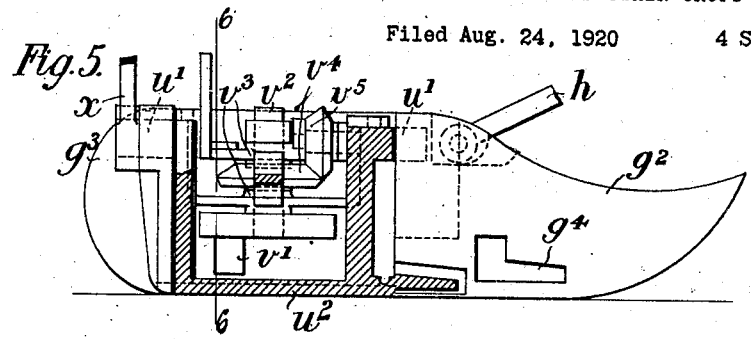
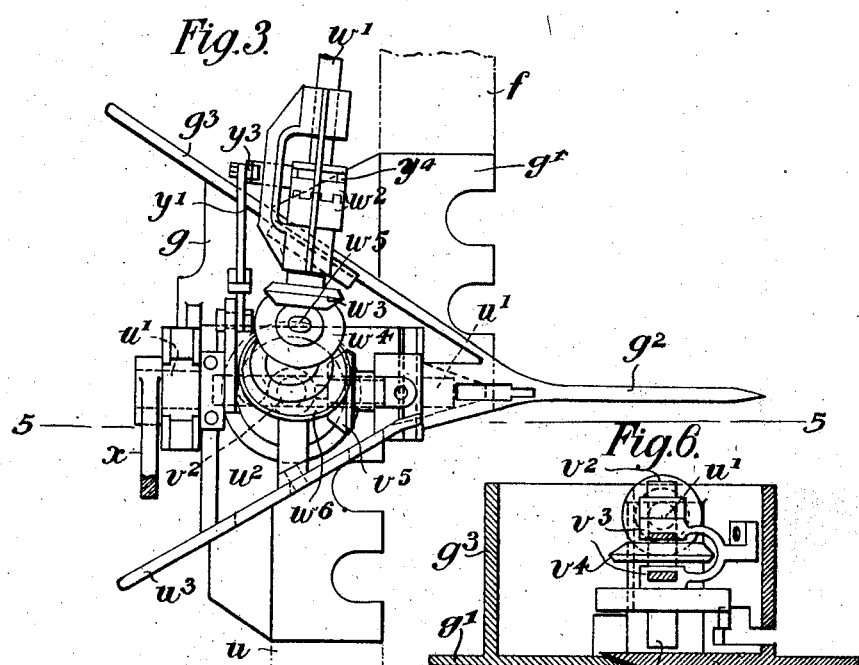
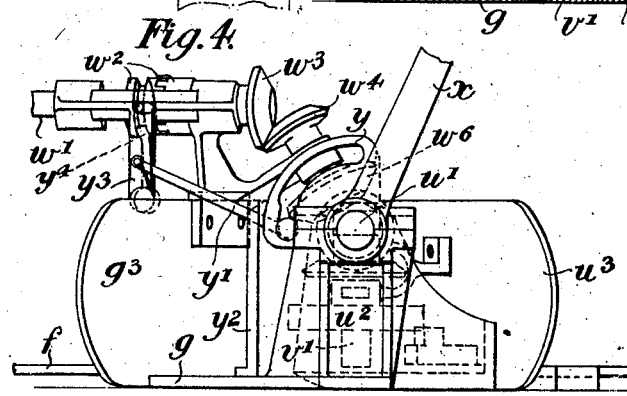

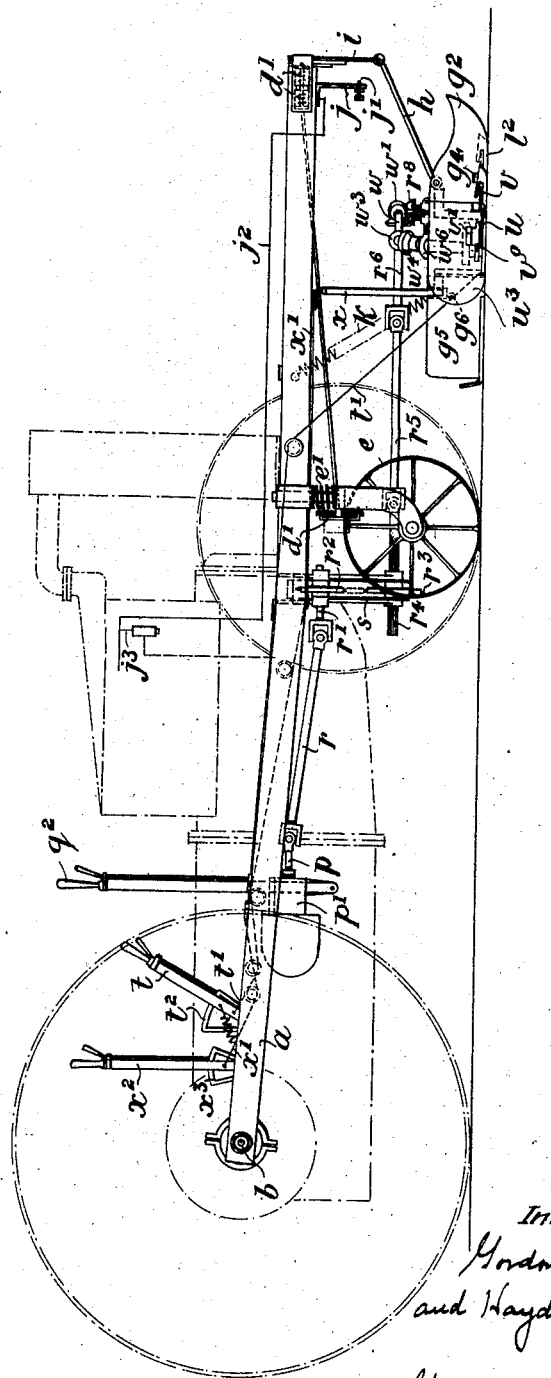

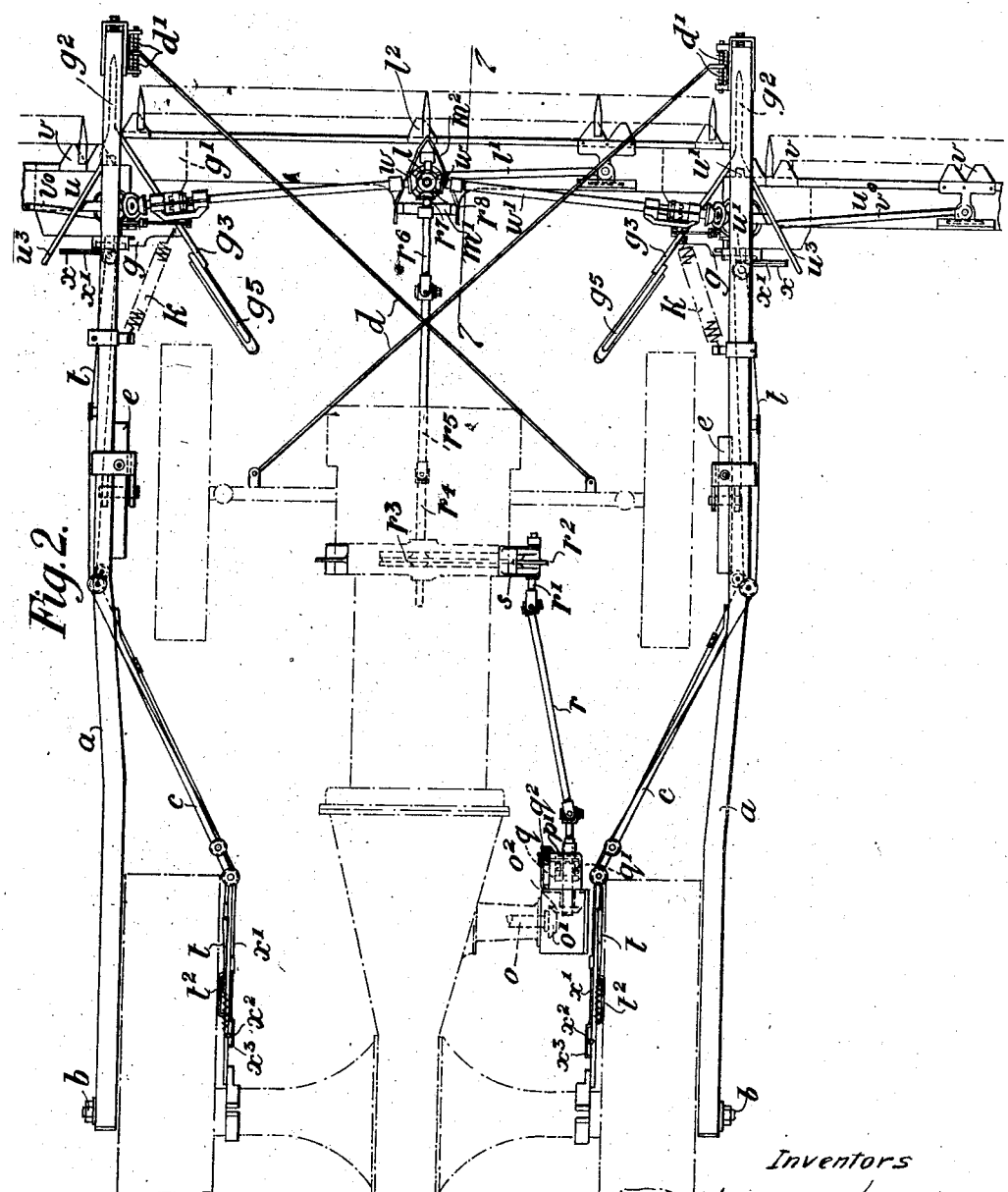

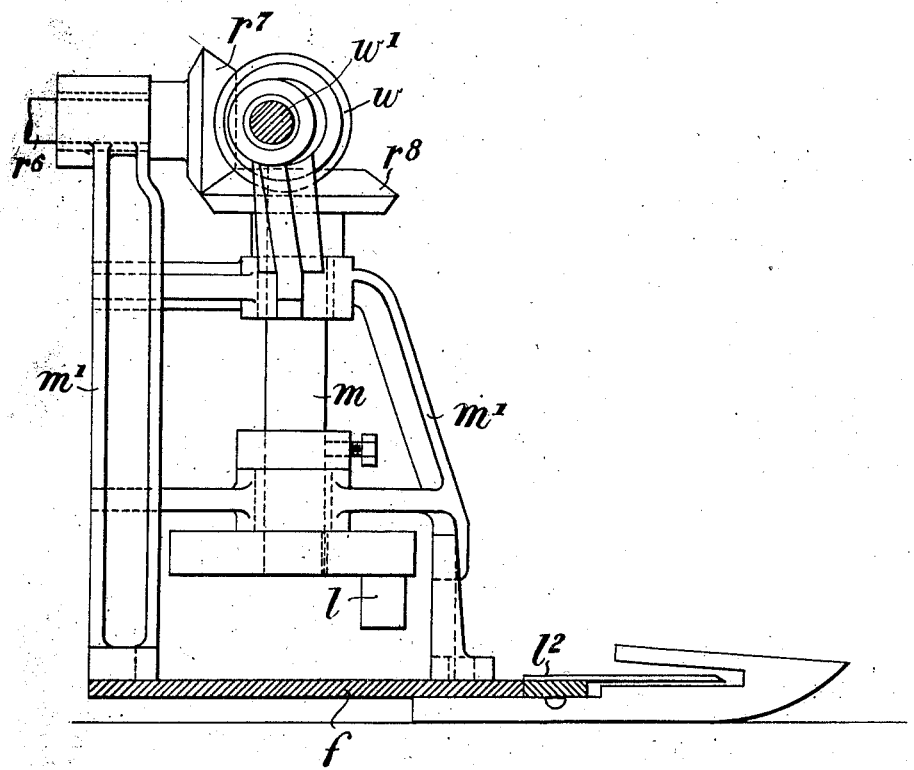

Patented Mar. 3, 1925.

1,528,553

UNITED STATES PATENT OFFICE.

GORDON FRANCIS KENNEDY, OF LONDON, AND HAYDN ARNOLD SANDERS, OF HIGH-BRIDGE, ENGLAND.

MOWING MACHINE FOR GRASS AND OTHER CROPS.

Application filed August 24, 1920. Serial No. 405,679.

*To all whom it may concern:*

Be it known that we, GORDON FRANCIS KENNEDY and HAYDN ARNOLD SANDERS, subjects of the King of Great Britain, residing at, respectively, 127 Holland Road, Kensington, London, England, and Huntspill, Highbridge, Somersetshire, England, have invented new and useful Improvements in Mowing Machines for Grass and Other Crops, of which the following is a specification.

This invention relates to machines chiefly intended for cutting grass, and has mainly for its object to provide a machine which is adapted for application to a motor tractor.

A machine constructed according to this invention is designed to be carried upon the front of a motor tractor so that it will be propelled thereby, the said machine comprising a frame which at its rear part is pivotally connected to the chassis or frame of the tractor, whilst at the front part it carries a finger-bar in which the knife or sickle reciprocates. The crank by means of which the sickle is reciprocated, preferably through the medium of levers or rods, is carried in bearings upon the frame and is designed to be driven from the engine of the tractor or direct from the tractor-roadwheel or other shafting through the medium of gearing and universal or like joints.

In order that, when the machine is travelling upon undulating ground, the fingers shall be prevented from digging into the soil, we provide, in connection with the finger-bar, wheels or skids which will run upon the ground and retain the finger-bar at the required distance therefrom and at the proper angle of incidence to the ground. In practice, these wheels or skids can be applied at the ends of the finger-bar. A lever or other device may be provided for lifting or varying the angle of incidence of the finger-bar when required.

We sometimes arrange in connection with one or both ends of the finger-bar an extension finger-bar which, or each of which, when not required for use, or when the implement is travelling upon the road, may be turned up to a more or less vertical position. The knife of each bar can be driven from the shaft driving the main knife or from an independent shaft or shafts. These extension finger-bars may be so mounted that they will slightly overlap the ends of the main finger-bar, when in working position, so as to avoid leaving a strip or strips of grass or other material between the main bar and the extensions.

The frame of the mower is constructed with a central opening so that as the swath is cut and falls backwards on to the finger-bar, it can be directed by means of suitable boards or guides through the frame to lie upon the ground in the space between the wheels of the tractor. The swath cut by the extension bar or bars can be directed to the centre of such bar or to one end thereof, as desired.

To enable the invention to be fully understood, we will describe it by reference to the accompanying drawing, in which:—

Figure 1 is a side view of a mowing machine constructed and arranged according to the invention, it being shown applied to the front of a tractor driven by an internal combustion motor and which is indicated by dotted lines.

Figure 2 is a plan thereof.

Figure 3 is a plan showing one of the skids or shoes and the joint between the main finger-bar and one of the extension finger-bars.

Figure 4 is a rear view thereof.

Figures 5 and 6 are respectively a sectional side view and a sectional rear view of some of the parts shown in Figures 3 and 4.

Figure 7 is a sectional side view illustrating some of the mechanism for driving the knife of the main finger-bar.

Figures 3 to 7 are drawn to a larger scale than Figures 1 and 2.

The frame of the mower comprises two side bars $a, a$ preferably of wood, which are pivotally connected at one end to the outer ends of the rear axle of the tractor as indicated at $b, b$ Figure 2. These bars $a$ have also a pivotal connection with the casing enclosing the said rear axle by means of metal bars $c, c$ attached at one end to the said bars $a$ the said bars $a$ and $c$ thus forming bifurcations in which the rear or driving wheels of the tractor run. The front ends of the bars $a$ are attached or tied to the front axle of the tractor by cross ties $d$, the ends of which are connected to the said bars and axle by the spring connections $d^1$. The bars $a$ are also supported near their front ends by swivel wheels $e$, springs $e^1$ being advantageously interposed between the said bars and wheels.

$f$ is the main finger-bar arranged below the front ends of the side bars $a$ and supported upon the ground through the medium of the skids or shoes $g$ to which they are attached by way of the plates or flanges $g^1$ forming the bases of the said shoes. The said shoes are provided with vertical flanges or dividing boards $g^2$ provided with rearward extensions $g^3$ which are inclined so as to direct the cut grass or the like towards the centre of the track cut by the knife carried by the finger bar $f$, as hereinafter described. The finger-bar $f$ is connected to the bars $a$ by two inclined tractor rods or links $h$, one end of each of which is pivoted to the upper part of a shoe $g$, whilst the other end is pivoted to a downward extension $i$ on a bar $a$. The said extensions $i$ are of a spring nature, as indicated in Figure 1, to enable them to yield when the finger-bar $f$ encounters an obstruction, means being provided whereby this yielding movement will effect the stopping of the motor of the tractor and thus avoid damage to the mower. Suitable means for this purpose comprise a depending arm $j$ on one or both bars $a$, suitably insulated from the said bars and carrying an electric contact $j^1$ in electrical connection by the wire $j^2$ with the motor sparkplug circuit $j^3$, as indicated in Figure 1, so that when the finger-bar $f$ meets with, and is held against further forward movement by an obstruction, the extensions $i$ will be deflected so as to make contact with the electric contact or contacts $j^1$, when the spark plugs will be short circuited and the motor stopped, the current passing from the circuit $j^3$, by way of the wire $j^2$, arm $j$ and contact $j^1$ to the extension $i$ whence it returns to the circuit $j^3$ by any suitable connection.

$k$ indicates springs which connect the rear ends of the shoes $g$ to the frame bars $a$ so as to tend to keep the fingers on the finger-bar $f$ well in contact with the ground and to assist in altering the inclination of the said finger-bar, as hereinafter described.

$l$ is the crank and $l^1$ the connecting rod by means of which the knife or sickle $l^2$ carried by the finger-bar $f$ is reciprocated, the said crank being keyed to the lower end of a vertical shaft $m$ journalled in bearings in a bracket $m^1$ supported on the finger-bar $f$, as clearly shown in Figures 2 and 7. The rod $l^1$ is covered by a suitable casing, not shown, attached to the finger-bar $f$.

One mode of rotating the shaft $m$ to reciprocate the knife from the motor is as follows, that is to say, from the shaft $o$ of the said motor, which shaft is used for driving machinery when the tractor is stationary, the usual pulley is removed and a bevel wheel $o^1$ substituted therefor, with which wheel another bevel wheel $o^2$, loose on a shaft $p$, is caused to gear, the said shaft being arranged in bearings in a casing $p^1$ attached to the casing of the motor. The bevel wheel $o^2$ is connected to a clutch part $q$, with which a clutch part $q^1$ slidably keyed to the shaft $p$ is designed to be engaged by a hand-lever $q^2$ so as to rotate the shaft $p$ which, through the medium of the rod $r$, shaft $r^1$, sprocket gearing $r^2$, $r^3$, shaft $r^4$, rod $r^5$, shaft $r^6$, and bevel wheels $r^7$, $r^8$, rotates the shaft $m$. The joints between the rod $r$ and shafts $q$ and $r^1$ and between the rod $r^5$ and shafts $r^4$ and $r^6$ are in the form of universal joints, whilst the connection between the sprocket wheel $r^3$ and the shaft $r^4$ is a sliding connection to allow for relative movement between the finger-bar $f$ and the frame $a$ when encountering obstructions. $s$ is a bracket attached to the motor casing and carrying the bearings for the shafts $r^1$ and $r^4$.

To enable the angle of incidence of the finger-bar $f$ relatively to the ground to be varied, hand-levers $t$ are employed mounted on the bars $c$ and connected by wires or the like $t^1$ to the rear ends of the shoes $g$ the said levers working in connection with notched quadrants $t^2$ so that the said levers can be locked in any position to which they have been adjusted, the springs $k$ assisting to lift the said rear ends.

$u$ indicates the extension finger-bars which are connected to the ends of the finger-bar $f$ by hinge joints through the medium of the shoes $g$, these joints being formed by trunnion pins $u^1$, on brackets $u^2$ carrying the said extension bars, engaging corresponding holes in the shoes $g$, as shown clearly in Figures 3 to 6. The knives or sickles $v$ of the extension finger-bars are reciprocated by rods $v^0$ operated by cranks $v^1$ on vertical shafts $v^2$ journalled in bearings $v^3$ in the brackets $u^2$, the said shaft carrying a bevel-wheel $v^4$ in gear with a bevel-wheel $v^5$ in axial alignment with the trunnions $u^1$. Each bevel-wheel $v^5$ is operated to rotate the crank $v^1$ from the shaft $m$ through the medium of a bevel-wheel $w$ in gear with the bevel wheel $r^8$, a shaft $w^1$, a clutch $w^2$, bevel-wheels $w^3$, $w^4$, shaft $w^5$ and bevel-wheel $w^6$ in gear with the bevel wheel $v^5$. The rods $v^0$ are covered by suitable casings, not shown, attached to the finger-bars $u$.

The extension finger-bars $u$ are designed to be turned up upon their hinge pins $u^1$ when not required for use, and for this purpose one of the said pins of each extension has a lever $x$ keyed to it, the outer end of which lever is connected by a wire $x^1$ or the like to a hand-lever $x^2$ working in conjunction with a notched quadrant $x^3$.

In connection with each extension finger-bar $u$ provision is made for automatically operating the clutch $w^2$ to prevent the reciprocation of the knives $v$ when the said bars are turned up upon their hinges. This is advantageously effected by cam slots $y$ Figure 4 in plates attached to the brackets $u^2$, in which slot pins on one end of rods $y^1$ sliding in guide brackets $y^2$ are located, whilst the other ends of the said rods are connected to levers $y^3$, the fulcrum pins of which carry forked levers $y^4$ in engagement with the sliding parts of the clutches $w^2$. It will thus be seen that, when the extension finger-bars $u$ are turned through a small angle on their hinges, the parts of the clutches $w^2$ will be separated. In the drawings the mechanism for turning the extension finger-bars $u$ on their hinges will only move them through a small angle just sufficient to disengage the clutches $w^2$, further movement to a vertical position, when travelling upon a road, being effected by hand, means, not shown, being provided for holding them in the said vertical position.

By reference to Figure 2 it will be seen that the adjacent ends of the knives $l^2$ and $v$ overlap so as to avoid leaving strips of uncut grass or the like at these points, the dividing-boards $g^2$ being formed with openings $g^4$ for the passage of the ends of the knife $l^2$.

$m^2$ Figure 2 is a projecting casing for the shaft $m$ and connected parts and $g^5$, $g^5$ are swath boards pivoted at $g^6$ to the rear ends of the extensions $g^3$ of the dividing boards $g^2$ of the shoes $g$ so as always to bear upon the ground for directing the cut material from the knife $l^2$ into a swath between the tractor wheels, notwithstanding alterations of the angle of incidence of the finger-bar $f$.

The construction of mower hereinbefore described thus provides a central opening or space so that the swath cut by the finger-bar $f$ is directed so as to lie on the ground between the wheels of the tractor, the swaths cut by the knives $v$ being directed in a similar manner by inclined directing surfaces $u^3$ on the brackets $u^2$ and directing surfaces, not shown, at the outer ends of the extension finger-bars such as are used in connection with horse drawn mowers.

It will be understood that the angle of incidence of the extension finger-bars $u$ will be altered by the operation of the hand-levers $t$ similarly to the main finger-bar $f$.

Although the improved machine has been described as having two extension finger-bars and knives one only may be employed.

By the described construction it will be seen that a mowing machine is provided which is capable of cutting a wider track than is possible with the ordinary horse-drawn mower, and that it can cut one, two or three swaths of usual width as required.

Although the mower is herein shown as applied to one form of tractor it is to be understood that by suitable modifications it can be applied to other forms of tractors without departing from the spirit of the invention.

Claims:
1. The combination with a tractor having a motor and front and rear axles, of a mowing attachment comprising a frame, means for attaching said frame to the rear axle of said tractor, a main finger bar and main cutter bar, positioned transversely of and in front of the tractor and connected to said frame, means for driving said cutter bar from said motor, an extension finger bar, means for hingedly connecting one end of said extension finger bar to one end of the main finger bar, an extension cutter bar supported on said extension finger bar, means for driving said extension cutter bar from the driving mechanism of the main cutter bar, means for moving the extension finger bar upwardly about its hinged connection with the main finger bar, and means for automatically disconnecting the driving mechanism of said extension cutter bar when the extension finger bar is turned up relatively to the main finger bar.

2. The combination as claimed in claim 1 wherein the means for connecting the finger bars to the frame permit the finger bars to trail on the ground, and wherein the means for moving the extension finger bar upwardly about its hinged connection to vary the angle of incidence of the finger bar and knife with respect to the ground comprises a lever and connections secured to said frame and finger bars.

3. The combination as claimed in claim 1 wherein the motor has a spark plug circuit and wherein the means for connecting the finger bars to the frame permits the finger bars to trail on the ground, spring means connected to the finger bars and frame adapted to yield when the finger bars meet an obstruction, an arm having an electric contact depending from said frame, and a wire connecting said arm with the spark plug circuit of said motor, said spring means when it yields, being adapted to make a contact with said depending arm for short circuiting said motor.

GORDON FRANCIS KENNEDY.
HAYDN ARNOLD SANDERS.